United States Patent [19]
Reithmaier

[11] 3,881,831
[45] May 6, 1975

[54] COUPLING FOR THE CONNECTION OF ROTARY PARTS

[75] Inventor: Egon Reithmaier, Gauting, Germany

[73] Assignee: Siemens Aktiengesellschaft, Berlin & Munich, Germany

[22] Filed: Mar. 7, 1974

[21] Appl. No.: 448,875

[30] Foreign Application Priority Data
Mar. 7, 1973 Germany............................ 2311296

[52] U.S. Cl. ................. 403/180; 403/334; 336/135
[51] Int. Cl. .............................................. F16d 1/00
[58] Field of Search .......... 403/334, 333, 383, 359, 403/180; 285/334.4; 279/102, 103; 336/83, 135

[56] References Cited
UNITED STATES PATENTS

| | | | |
|---|---|---|---|
| 797,638 | 8/1905 | Thomas .......................... | 403/334 X |
| 797,820 | 8/1905 | Peck ............................... | 403/334 X |
| 1,136,987 | 4/1915 | Wakfer ......................... | 279/103 UX |
| 1,445,142 | 2/1923 | Kirkham ............................. | 403/334 |
| 3,593,244 | 7/1971 | Meindl et al.......................... | 336/83 |

*Primary Examiner*—Andrew V. Kundrat
*Attorney, Agent, or Firm*—Hill, Gross, Simpson, Van Santen, Steadman, Chiara & Simpson

[57] ABSTRACT

Two rotary parts are connected by a coupling. The end of a pin-type coupling shaft is embodied as a triangular acute-angle pyramid, and it engages in a corresponding recess of another member. This coupling serves in particular for the fine adjustment of the inductance of cup cores where one cup core half can be rotated with respect to the other.

6 Claims, 3 Drawing Figures

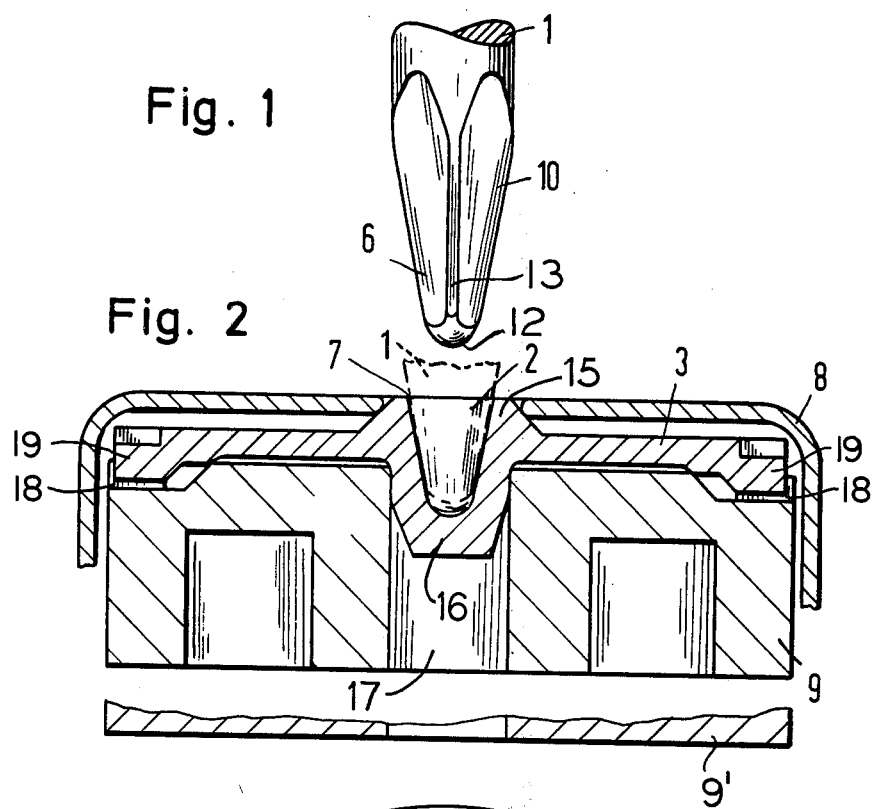

3,881,831

COUPLING FOR THE CONNECTION OF ROTARY PARTS

BACKGROUND OF THE INVENTION

This invention is directed to a coupling connecting two rotary parts, in particular a device for adjusting the inductance of cup cores whereby one cup core half can be rotated with respect to the other.

Coil members for cup cores are used in large numbers, for instance as channel filter coils in carrier frequency transmission systems. The cup core halves must be rotated with respect to one another in order to adjust them to certain inductance values. Due to the large number of coils which are made in mass production, it has been found desirable to design a coupling for adjusting these cup core halves with respect to one another, where one cup core half is connected quickly and inexpensively with the end of the drive axle of an adjusting device.

SUMMARY OF THE INVENTION

In accordance with the present invention, a shaft extends from the adjusting device and has an end which is embodied as an acute-angle pyramid of a triangular cross section. This end engages with a correspondingly shaped recess of the cup core, whereby the angle formed by the recess wall with respect to the axis of the cup core arrangement is somewhat smaller than that formed by the pyramid-shaped shaft end with respect to the shaft axis. According to a particularly advantageous embodiment, the angle formed by the pyramid surfaces with respect to the shaft axis is approximately 5°' and the angle between the corresponding recess and the cup core axis is approximately 5°. To avoid accidental damage, it is advantageous to round off the tip and the edges of the shaft end.

The coupling described above is uncomplicated and it evens out tolerance fluctuations of the connected parts, in particular minor relative displacements of the axes.

Another feature of the invention pertains to an arrangement where the recess is integral with a pressure disk which, in turn, can be connected with a cup core half. This is particularly advantageous since pressure disks are required for cup core coils to form a bearing for the spring-clip type brackets holding the two cup core halves together. If the recess is made an integral part of this pressure disk, no additional parts will be required for the adjusting process.

These and other objects, advantages and features of the present invention will be discussed in further with reference to the drawing, although variations and modifications may be effected without departing from the spirit and scope of the novel concepts of the disclosure.

BRIEF DESCRIPTION OF THE DRAWINGS

FIG. 1 is the end of the shaft of a drive axle forming part of an adjusting device for the automatic inductance adjustment of cup cores;

FIG. 2 is a section through the rotary cup core half of a cup core arrangement with the pressure disk, and a part of the spring clip connecting the two cup core halves; and FIG. 3 is a top view of the pressure disk.

DESCRIPTION OF THE PREFERRED EMBODIMENTS

FIG. 1 shows a shaft 1 which forms a part of the drive axle of an adjusting device for the fine adjustment of cup core halves with respect to one another in order to automatically adjust their inductance to a predetermined value.

The end of the shaft is embodied as an acute-angle pyramid 6 of a triangular cross section. According to a particularly advantageous embodiment, the angle formed by the pyramid surfaces 10 with respect to the shaft axis is approximately 5°'. The tip 12 and the edges 13 of this pyramid have been rounded off to avoid accidental damage.

FIG. 2 shows the mating recess 2 in the pressure disk 3 of a cup core arrangement consisting of two cup core halves, indicated at 9 and 9'. It is shown in particular in FIG. 3 that this recess 2 comprises pyramid surfaces 4 corresponding to the pyramid surfaces 10 of the shaft 1 in FIG. 1. The angle formed by the pyramid surfaces 10 with respect to the shaft 1 axis is slightly larger than that formed by the pyramid surfaces 4 with respect to the cup core axis, for instance 5°'. In FIG. 2, the position of the shaft 1 with respect to this recess 2 has been shown as dotted line.

Recess 2 forms an intergral of pressure disk 3 in such a way that a circular shoulder 15 forms the upper limit of this recess 2 and a depending boss 16 forms the lower end. The depending boss 16 extends into an axial bore 17 of the cup core half, while the shoulder 15 forms the seat for a spring clip type bracket 8 connecting the two cup core halves. Thereby, the bore 17 of the cup core half does not need to be excessively large because of the small dimensions of the coupling.

When the cup core halves 9 and 9' are adjusted with respect to one another the shaft 1 is applied to the pressure disk, and the shoulder 15 forming the bearing for the spring clip 8 is pressed downwardly allowing to adjust the cup core half 9' with respect to the other cup core half and with respect to the spring clip 8. The cup core half 9 includes slots 18 which receive corresponding projections 19 of the pressure disc 3 to couple the shaft 1 to the cup core half 9. The cup core half 9 with the coupling is rotated by the shaft 1 until the inductance value of the cup core arrangement coincides with a preselected desired value. With this structure, the shaft 1 touches recess 2 only in the relatively small range 7. This allows application of the shaft 1 to the recess 2, and removal therefrom, in an uncomplicated manner. Free play between the shaft 1 and the pressure disk 3 connected with the shaft via the recess 2 cannot occur with this coupling arrangement.

In addition, a minor inclination of the shaft axis with respect to the pressure disk axis does not influence the adjustment. The coupling balances tolerances of this kind due to the different angles formed by the pyramid surfaces 10 with respect to the shaft 1 and those of the recess 2 with respect to the cup core axis.

It will be apparent from the above description of a preferred embodiment according to this invention, that this invention provides a simple, practical and effective method of coupling a cup core half with an adjusting device. Although there may be variations and modifications made by those skilled in the art, it is my desire to include these variations and modifications within the scope of my invention as defined in the appended claims.

I claim:

1. A coupling for interconnecting two rotary members, in particular for connecting an inductance adjusting device for cup core arrangements with a first cup core half and for rotating the first cup core half with respect to a second cup core half, comprising:
   a shaft having one end embodied as a pyramid of triangular cross section with the pyramid surfaces arranged at an acute angle with respect to the shaft,
   a first cup core half,
   a pressure disc coupled with said first cup core half and including a shoulder having a recess therein, said recess having corresponding mating pyramid surfaces arranged at a slightly smaller angle with respect to the axis of said first cup core half than the angle formed by the triangular surfaces with said shaft, and
   a spring clip connecting said first cup core half and the second cup core half, said shoulder bearing against said spring clip and disengaged from such bearing in response to depression of the shaft into said recess to permit rotation of said first cup core half with respect to the second cup core half.

2. A coupling in accordance with claim 1, wherein the shaft forms a part of a drive axle of an adjusting device.

3. A coupling in accordance with claim 1, wherein the triangular surfaces of said recess form an angle of approximately 5° with the cup core axis, and the triangular surfaces of the shaft form an angle of approximately 5°' with the shaft.

4. A coupling in accordance with claim 1, wherein the tip and the edges of the shaft are rounded to avoid accidental damage of the cup core arrangement.

5. A coupling in accordance with claim 1, wherein said pressure disc includes a depending boss and the recess for accepting said shaft extends into said depending boss, and said first cup core half includes an axial bore having an internal surface and said depending boss extends into said bore and engages said internal surface of said first cup core half.

6. An adjustable pot core arrangement including two core halves having a common concentric axis, and means for adjusting the inductance of the pot core arrangement by relative rotation of the two core halves about that common axis, each of said core halves including an aligned central bore therein, a rotatable pressure disc disposed adjacent a first of said core halves, said pressure disc and said first core half having cooperable means constructed for interlocking engagement whereby rotation of said disc is transmitted to said first core half, a spring clip embracing said core halves and said pressure disc and arranged to bear on said pressure disc to retain said core halves and said disc in operative positions, said pressure disc including a shoulder extending axially therefrom and engaging said spring and said shoulder having a shaped recess therein to receive a correspondingly shaped adjusting shaft, said shoulder responsive to depression of the shaft in the recess to disengage from said spring clip and permit rotation of said first cup core half with respect to the other cup core half upon rotation of the shaft.

* * * * *